United States Patent [19]

Schneider

[11] Patent Number: 5,527,068

[45] Date of Patent: Jun. 18, 1996

[54] MOTOR VEHICLE STEERING COLUMN

[75] Inventor: Douglas M. Schneider, Bridgeport, Mich.

[73] Assignee: General Motors Corporation, Detroit, Mich.

[21] Appl. No.: 453,548

[22] Filed: May 30, 1995

[51] Int. Cl.⁶ ..................................................... B62D 1/18
[52] U.S. Cl. ............................................ 280/775; 74/493
[58] Field of Search ................................ 280/775; 74/493

[56]  References Cited

U.S. PATENT DOCUMENTS

| | | | |
|---|---|---|---|
| 4,472,982 | 9/1984 | Nishikawa | 74/493 |
| 4,732,050 | 3/1988 | Vollmer | 74/493 |
| 5,052,240 | 10/1991 | Miyoshi et al. | 74/493 |
| 5,117,707 | 6/1992 | Kinoshita et al. | 74/493 |
| 5,161,425 | 11/1992 | Baskett et al. | 74/493 |
| 5,199,319 | 4/1993 | Fujiu | 74/493 |
| 5,213,003 | 5/1993 | Speich | 74/493 |
| 5,301,567 | 4/1994 | Snell et al. | 74/493 |
| 5,338,064 | 8/1994 | Sadakata et al. | 280/775 |

*Primary Examiner*—Kenneth R. Rice
*Attorney, Agent, or Firm*—Saul Schwartz

[57]  ABSTRACT

An adjustable motor vehicle steering column including a mast jacket moveable between a plurality of positions and a position control apparatus including a stationary bracket, a moveable bracket attached to the mast jacket parallel to the stationary bracket, a manually actuated primary clamp on the stationary bracket operative when closed to squeeze together the moveable and stationary brackets for frictional retention of the position of the mast jacket and when open to release the stationary and moveable brackets for adjustment of the position of the mast jacket, and a secondary clamp which automatically increases the clamping force on the stationary and moveable brackets in response to the onset of relative sliding movement between the stationary and moveable brackets in the closed position of the primary clamp. In a preferred embodiment, the secondary clamp includes a pair of wedge-shaped roller chambers in a jaw element of the primary clamp exposed to the moveable bracket and a roller in each of the roller chambers.

5 Claims, 3 Drawing Sheets

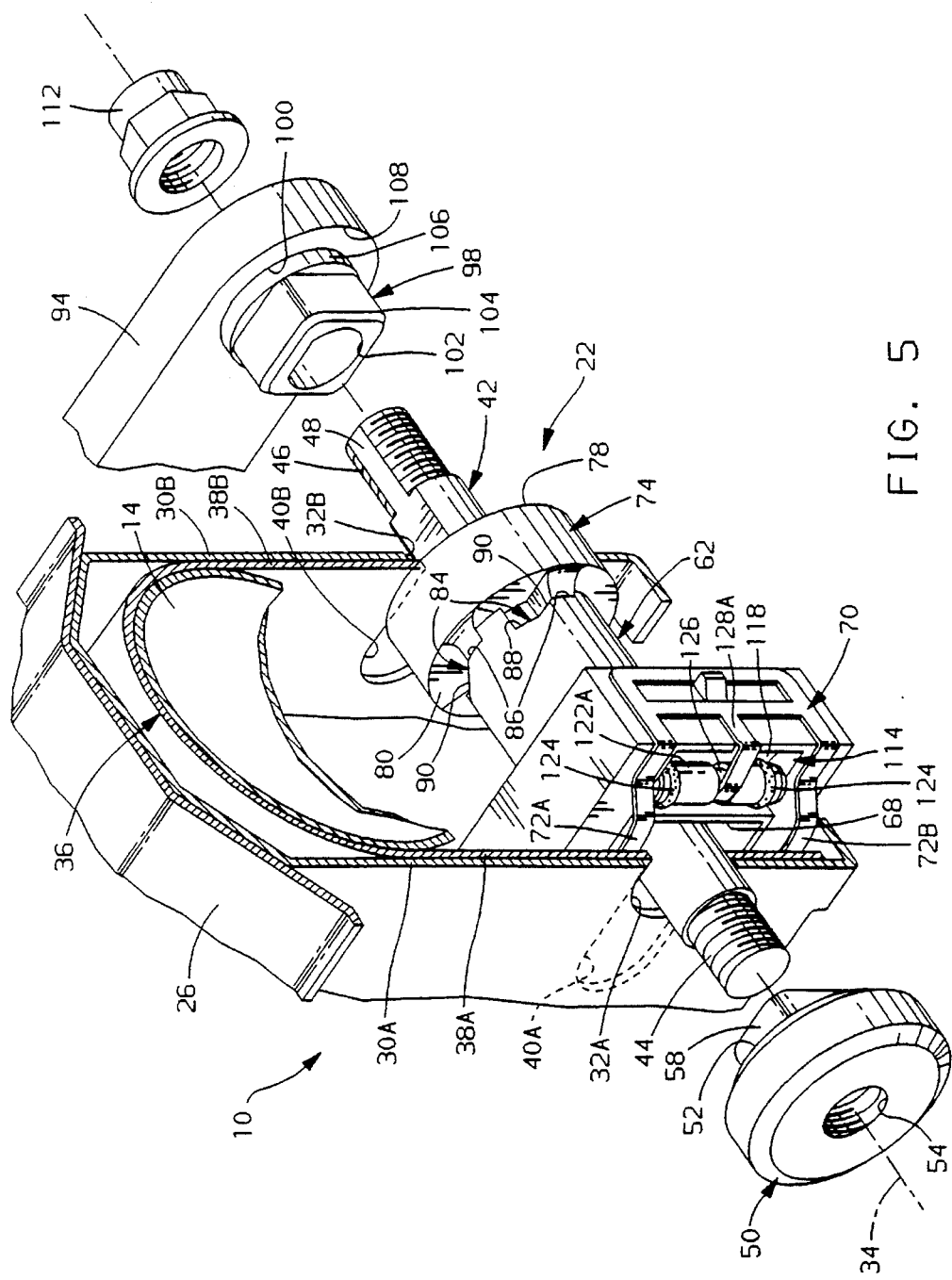

5,527,068

MOTOR VEHICLE STEERING COLUMN

FIELD OF THE INVENTION

This invention relates to adjustable steering columns for motor vehicles.

BACKGROUND OF THE INVENTION

U.S. patent application Ser. No. 08/332,302, filed 31 Oct. 1994 and assigned to the assignee of this invention, describes an adjustable motor vehicle steering column including a position control apparatus consisting of a stationary bracket, a moveable bracket attached to an adjustable mast jacket of the steering column and juxtaposed the stationary bracket, and a clamp having first and second jaw elements on opposite sides of the juxtaposed stationary and moveable brackets. The clamp includes a control lever and means for converting pivotal movement of the control lever into a first axial stroke of the first jaw element and a second axial stroke of the second jaw element for maximum separation between the first and second jaw elements when the clamp is open. Spline teeth on one of the jaw elements engage spline teeth on the moveable bracket when the clamp is closed for maximum retention of the relative positions of the moveable and stationary brackets.

SUMMARY OF THE INVENTION

This invention is a new and improved adjustable motor vehicle steering column including a mast jacket moveable between a plurality of positions and a position control apparatus including a stationary bracket, a moveable bracket attached to the mast jacket parallel to the stationary bracket, a manually actuated primary clamp on the stationary bracket operative when closed to squeeze together the moveable and stationary brackets for frictional retention of the position of the mast jacket and when open to release the stationary and moveable brackets for adjustment of the position of the mast jacket, and a secondary clamp which automatically increases the clamping force on the stationary and moveable brackets in response to the onset of relative sliding movement between the stationary and moveable brackets in the closed position of the primary clamp. In a preferred embodiment, the secondary clamp includes a pair of roller chambers in a jaw element of the primary clamp exposed to the moveable bracket and a roller in each of the roller chambers. The bottoms of the roller chambers define oppositely inclined ramps so that one or the other of the rollers wedges between the moveable bracket and the corresponding ramp in accordance with the direction of movement of the moveable bracket to progressively more tightly clamp the stationary and moveable brackets together.

BRIEF DESCRIPTION OF THE DRAWINGS

FIG. 5 is a fragmentary, exploded perspective view of the steering column according to this invention.

DESCRIPTION OF A PREFERRED EMBODIMENT

Figure 1:
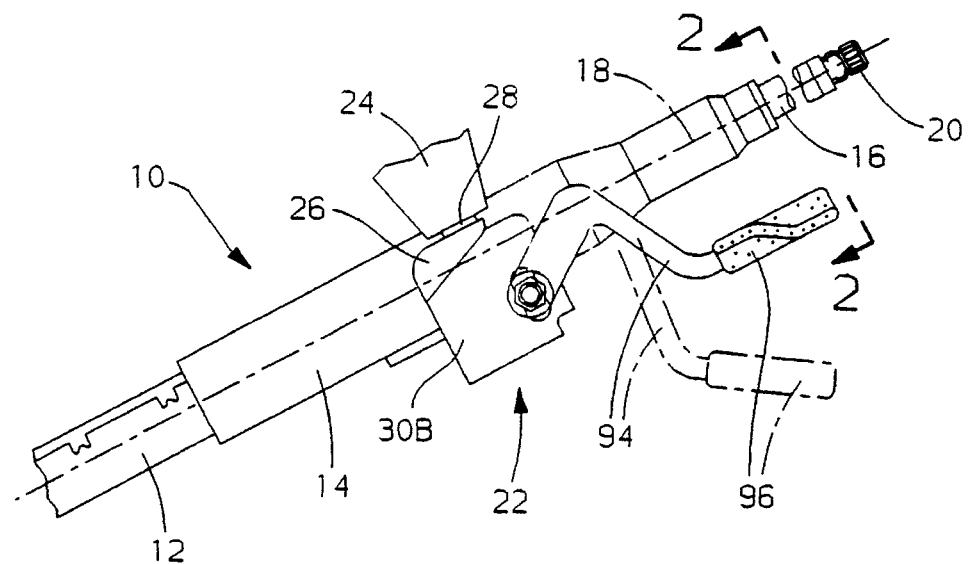
FIG. 1 is a fragmentary elevational view of an adjustable motor vehicle steering column according to this invention.

Referring to FIG. 1, a motor vehicle steering column 10 according to this invention includes a tubular lower mast jacket 12 and a tubular upper mast jacket 14 telescopically overlapping the lower mast jacket. A steering shaft 16 is supported on the mast jackets 12, 14 for rotation about a longitudinal centerline 18 of the steering column. A steering wheel, not shown, is attached to an end 20 of the steering shaft. The upper mast jacket is moveable in and out in the direction of the longitudinal centerline 18 for adjusting the horizontal position of the steering wheel. A position control apparatus 22 is disposed between the upper mast jacket 14 and a structural element 24 of the vehicle body.

Figure 2:
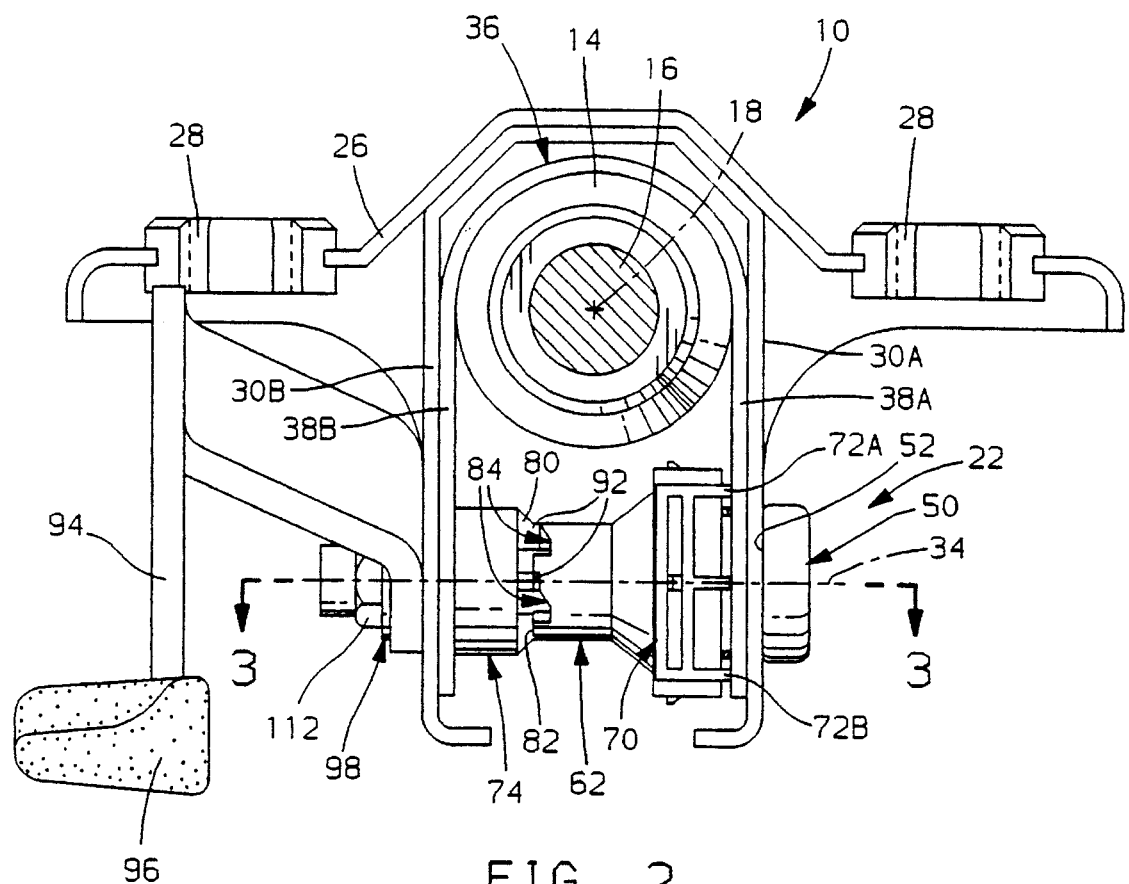
FIG. 2 is an enlarged sectional view taken generally along the plane indicated by lines 2—2 in FIG. 1.

As seen best in FIGS. 1–2, the position control apparatus 22 includes a stationary bracket 26 on which are mounted a pair of capsules 28. Each capsule is open in the center for passage therethrough of a hanger bolt, not shown, attached to the structural element 24. Nuts, not shown, on the hanger bolts below the capsules rigidly affix the stationary bracket 26 to the structural element 24. The stationary bracket 26 includes a pair of vertical stationary legs 30A–B on opposite sides of the upper mast jacket 14 having a degree of lateral flexibility and a pair of circular holes 32A–B in the legs 30A–B, respectively, aligned on a lateral centerline 34.

A column bracket 36, shaped like an inverted "U", is rigidly attached to the upper mast jacket for movement as a unit therewith in the direction of the centerline 18 and includes a pair of vertical moveable legs 38A–B juxtaposed the vertical stationary legs 30A–B, respectively. Each of the moveable legs 38A–B has a degree of lateral flexibility and one of a pair of horizontal slots 40A–B aligned vertically with the circular holes 32A–B, respectively, in the stationary legs.

Figure 3:
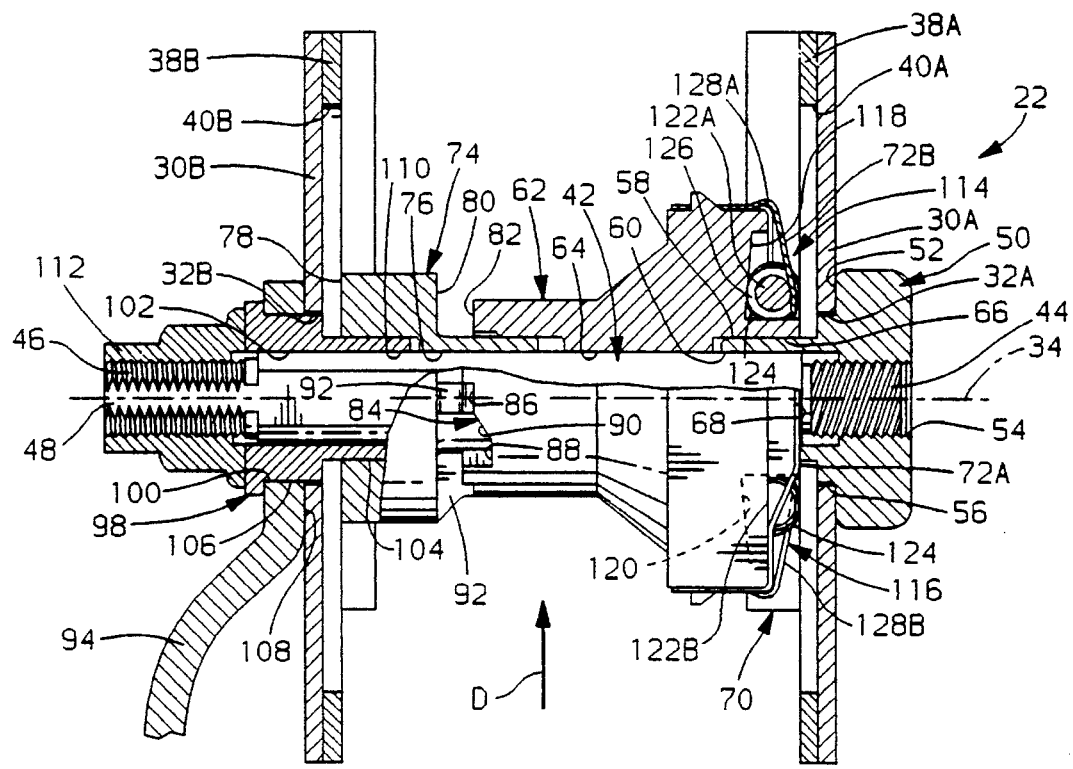
FIG. 3 is a fragmentary sectional view taken generally along the plane indicated by lines 3—3 in FIG. 2.
Figure 4:
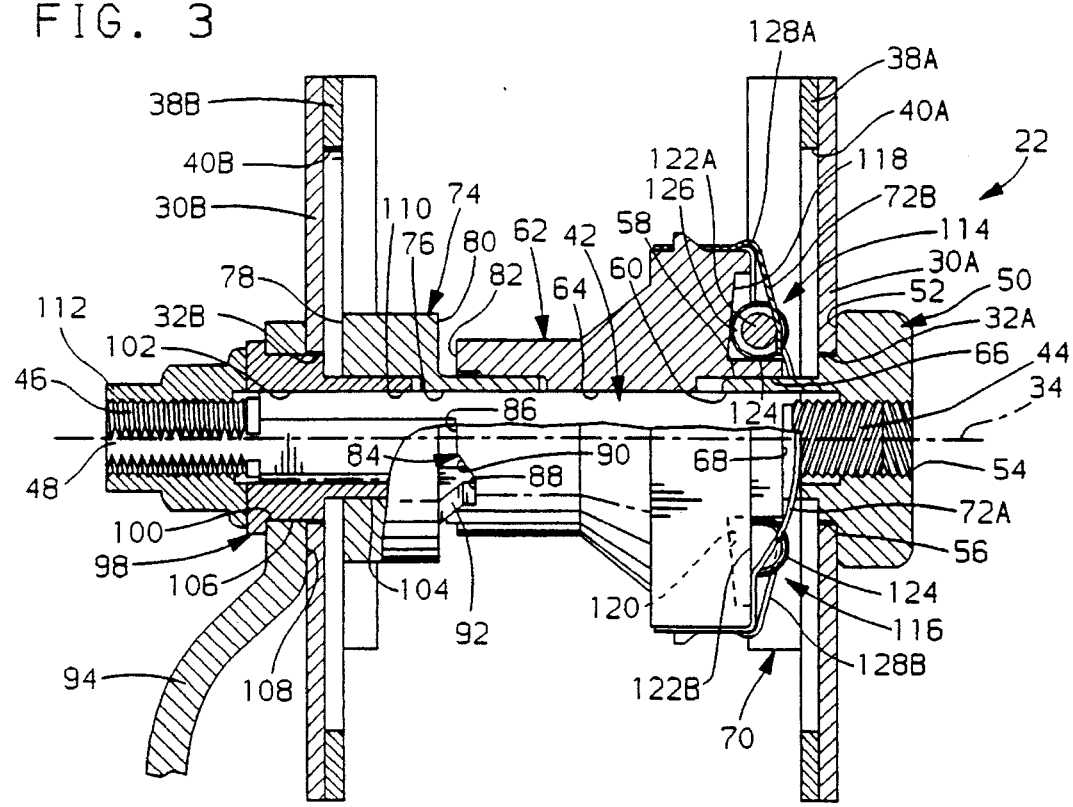
FIG. 4 is similar to FIG. 3 but showing elements of the steering column according to this invention in different relative positions.

As seen best in FIGS. 3–5, a control shaft 42 extends through each of the circular holes 32A–B and the slots 40A–B and includes a first screw thread 44 at one end outboard of the stationary leg 30A, a second screw thread 46 at the other end outboard of the stationary leg 30B, and a flat side 48 traversing the second screw thread 46 and an adjacent plain cylindrical portion of the control shaft. The horizontal slots 40A–B accommodate in and out movement of moveable legs 38A–B with the upper mast jacket 14 in the direction of the centerline 18 of the steering column through a range of positions limited by the ends of the horizontal slots.

A first nut 50 of the position control apparatus has an annular side wall 52 around a screw threaded center 54, a cylindrical pilot 56, FIGS. 3–4, perpendicular to the side wall 52, a square pilot 58 perpendicular to the side wall 52, and a plain cylindrical bore 60 contiguous with the threaded center 54 of the nut. The first screw thread 44 on the control shaft 42 is received in the threaded center 54 of the nut 50 with the side wall 52 of the nut facing the stationary leg 30A. The cylindrical pilot 56 on the nut fits in the circular hole 32A to support one end of the control shaft on the stationary bracket 26 for rotation about the lateral centerline 34. The square pilot 58 on the nut projects through the horizontal slot 40A and engages the sides of the latter to prevent rotation of the nut 50 about the lateral centerline 34.

A first barrel 62 of the position control apparatus 22 is journaled on the control shaft 42 between the moveable legs 38A–B by a plain bore 64 in the barrel. The square pilot 58 on the first nut 50 seats in a correspondingly shaped cavity 66, FIGS. 3–5, in a bearing end 68 of the first barrel facing the moveable leg 38A whereby the first barrel is restrained against rotation about the lateral centerline 34. A metal clip 70 snaps onto the first barrel 62 over the bearing end 68 thereof and has a pair of integral leaf springs 72A–B urging relative separation between the bearing end 68 and the moveable leg 38A.

A second barrel 74 is journaled on the control shaft 42 between the first barrel 62 and the moveable leg 38B by a plain cylindrical bore 76 in the second barrel. The second barrel has an annular bearing end 78 facing the moveable leg 38B and an annular cam end 80 facing an annular cam end 82 of the first barrel 62. A cylindrical pilot on the second barrel extends into a counter bore in the first barrel for maximizing the span of the journal between the control shaft and the second barrel.

As seen best in FIGS. 3–5, a plurality of rotary cam notches 84 are formed in the cam end 82 of the first barrel. Each cam notch has an upper platform 86, a lower platform 88, and an incline 90 between the upper and lower platforms. A plurality of cam followers 92 on the cam end 80 of the second barrel project into corresponding ones of the cam notches 84. The leaf springs 72A–B bias the cam notches 84 against the cam followers 92 and, in turn, the bearing end 78 of the second barrel 74 against the moveable leg 38B. Relative rotation between the first and second barrels about the lateral centerline 34 induces an axial stroke between the barrels in the direction of the centerline 34 corresponding to the axial distance separating the upper and lower platforms 86, 88.

A control lever 94 of the position control apparatus 22 has a finger tab 96 at one end thereof and a thimble-shaped hub 98 rigidly mounted in a circular hole 100 at the other end thereof. The hub 98 has a bore 102 therethrough matching the D-shape of the control shaft 42 attributable to the flat side 48 thereof, a square pilot 104, and a cylindrical pilot 106 between the square pilot and a side wall 108 of the control lever. The hub 98 fits over the control shaft 42 from outboard of the stationary leg 30B with the square pilot 104 seating in a correspondingly shaped cavity 110 in the bearing end 78 of the second barrel 74 and with the cylindrical pilot 106 journaled in the circular hole 32B in the stationary leg 30B. The control lever 94, the control shaft 42, and the second barrel 74 are all rotatable as a unit about the lateral centerline 34. A second nut 112 on the second screw thread 46 on the control shaft outboard of the hub 98 retains the control lever 94 on the control shaft and rotates as a unit with the control shaft.

As seen best in FIGS. 3–5, the first barrel 62 has a first roller chamber 114 formed in the bearing end 68 thereof on one side of the cavity 66 and a second roller chamber 116 in the bearing end 68 on the opposite side of the cavity 66. Each of the roller chambers 114, 116 opens toward the moveable leg 38A. The first roller chamber 114 has a bottom wall defining a first ramp 118, FIGS. 3–5, inclined relative to the plane of the moveable leg 38A. The second roller chamber 116 has a bottom wall defining a second ramp 120 inclined relative to the plane of the moveable leg 38A in the opposite direction from the first ramp 118.

A pair of cylindrical rollers 122A–B are disposed in the first and second roller chambers 114, 116, respectively. Each of the rollers has a pair of traction-inducing rubber rings 124 thereon near its opposite ends and a center groove 126, FIG. 5. A pair of integral cantilever springs 128A–B of the metal clip 70 project into the first and second roller chambers 114, 116 from opposite sides of the first barrel and seat in the grooves 126 in the first and second rollers 122A–B. The cantilever springs bias the rollers 122A–B to retracted positions, FIG. 4, at the deepest end of the corresponding roller chamber 114, 116.

A first primary clamp for squeezing together the stationary and moveable legs 30A, 38A has a first or inner jaw element defined by the bearing end 68 of the first barrel and a second or outer jaw element defined by the side wall 52 of the first nut 50. A second primary clamp for squeezing together the stationary and moveable legs 30B, 38B has a first or inner jaw element defined by the bearing end 78 of the second barrel and a second or outer jaw element defined by the side wall 108 of the lever 94. The cam notches 84 and the cam followers 92 constitute a means for converting pivotal movement of the control lever 94 and control shaft 42 into an axial stroke of the inner jaw element of the first primary clamp. The first screw thread 44 on the control shaft 42 and the screw threaded center 54 of the first nut 50 constitute a means for converting pivotal movement of the control lever and the control shaft into an opposite axial stroke of the outer jaw element of the first primary clamp.

In a clamping position of the control lever 94, FIGS. 1–3, the cam followers 92 seat on the upper platforms 86 and the first nut 50 is innermost on the first screw thread 44 so that the first and second primary clamps are closed. When the primary clamps are closed, the bearing ends 68, 78 of the first and second barrels, respectively, experience maximum axial separation and the side walls 52, 108 of the first nut 50 and the control lever 94 experience minimum axial separation. The closed primary clamps squeeze together the stationary and moveable legs 30A, 38A and 30B, 38B to induce friction therebetween which captures a selected position of the mast jacket 14 relative to the stationary bracket 26.

To release the upper mast jacket 14 for positional adjustment, the control shaft 42 and control lever 94 are pivoted clockwise, FIG. 1, by manual force on the finger tab 96 through an angular stroke from the clamping position of the lever to a releasing position 94' thereof, FIG. 1. Rotation of the control shaft induces relative rotation between the first and the second barrels 62, 74 so that the cam followers 92 move across the inclines 90 from the upper platforms 86 to the lower platforms 88 to reduce to a minimum the axial separation between the bearing ends 68, 78 on the first and second barrels. Because the leaf springs 72A–B hold the bearing end 78 against the moveable leg 38B, the aforesaid reduction in axial separation manifests itself as a first axial stroke of the inner jaw element defined by the bearing end 68 of the first barrel 50 away from the moveable leg 38A, FIG. 4.

Concurrently, rotation of the control shaft from the clamping position to the releasing position thereof unscrews the first screw thread 44 from the threaded center 54 of the first nut 50 to increase to a maximum the axial separation between the side wall 52 of the first nut and the side wall 108 of the control lever 94. Due to the lateral flexibility of the stationary and moveable legs and the bias of the leaf springs 72A–B, the aforesaid increase in axial separation manifests itself as a second axial stroke of the outer jaw element defined by the side wall 52 of the first nut away from the inner jaw element defined by the bearing end 68 of the first barrel. Accordingly, the total axial stroke between the inner and outer jaw elements of the first primary clamp corresponding to pivotal movement of the control lever from the clamping to the releasing position is the sum of the first and second axial strokes for maximum axial separation between the bearing end 68 and the moveable leg 38A.

The roller chambers 114, 116 and the rollers 122A–B constitute a secondary clamp which automatically increases the force clamping together the stationary and moveable legs 30A, 38A in the circumstance that primary clamps are overpowered. The primary clamps are overpowered, for example, when a force urging foreshortening of the steering column overcomes the friction between the stationary and moveable legs 30A, 38A and 30B, 38B induced by the closed primary clamps and initiates sliding movement of the moveable legs 38A–B in a direction "D" relative to the stationary legs 30A–B, FIG. 3.

The diameter of the rollers 122A–B is calculated to assure that when the primary clamps are closed, the rubber rings 124 on the rollers concurrently engage the moveable vertical leg 38A and the corresponding one of the ramps 118, 120. Since the first barrel 62 is mounted on the stationary bracket 26 through the control shaft 42 and, therefore, is immoveable in the direction "D", the rubber rings 124 roll the first roller 122A toward the narrow or wedge-shaped end of the first roller chamber 114 as the moveable leg 38A starts to slide relative to the stationary leg 30A. Because the first and second barrels 62, 74 are captured in the direction of the lateral centerline 34, the first roller wedges tightly between the ramp 118 and the moveable leg 38A after a very short linear excursion in the direction "D".

As the roller 122A wedges between the moveable leg 38A and the ramp 118, the force squeezing together the stationary and moveable legs 30A, 38A increases rapidly to a magnitude at which friction between the stationary and moveable legs arrests relative movement therebetween and prevents the primary clamps from being further overpowered. Importantly, the secondary clamp automatically clamps tighter as the force overpowering the primary clamps increases.

When the primary clamps are open, FIG. 3, the cantilever springs 128A–B maintain the rollers 122A–B in their retracted positions. The total axial stroke between the inner and outer jaw elements of the first primary clamp affords maximum separation between the rubber rings 124 on the rollers and the moveable leg 38A to assure that adjustment of the position of the upper mast jacket 14 is unhindered by actuation of the secondary clamp occasioned by inadvertent contact between the rubber rings and the moveable leg 38A.

I claim:

1. A motor vehicle steering column including a mast jacket moveable in a first direction in a vertical plane from a first position to a second position and in an opposite second direction in said vertical plane from said second position to said first position, characterized in that said steering column includes a position control apparatus comprising:

a stationary bracket having a stationary leg in a plane parallel to said vertical plane, a moveable bracket attached to said mast jacket for movement as a unit therewith having a moveable leg juxtaposed and parallel to said stationary leg, a primary clamp means on said stationary bracket having an inner jaw element on one side of said stationary and said moveable legs facing said moveable leg and an outer jaw element on the other side of said stationary and said moveable facing said stationary leg, means operative to close said primary clamp means by moving said inner jaw element and said outer jaw element through a total axial stroke toward each other in response to pivotal movement of an operating lever from a releasing position to a clamping position and to open said primary clamp means by moving said inner jaw element and said outer jaw element through said total axial stroke away from each other in response to pivotal movement of said operating lever from said clamping position to said releasing position, said primary clamp means being operative when closed to squeeze said stationary and said moveable legs together so that friction therebetween captures the position of said moveable leg relative to said stationary leg, and a secondary clamp means operative when said primary clamp means is closed and in response to the onset of movement of said moveable leg in said first direction relative to said stationary leg characteristic of said primary clamp means being overpowered to automatically squeeze said stationary and said moveable legs more tightly together to increase the friction therebetween and thereby arrest the continued movement of said moveable leg in said first direction relative to said stationary leg.

2. The motor vehicle steering column recited in claim 1 wherein said secondary clamp means comprises:

a first roller chamber in said inner jaw element open toward said moveable leg having a bottom inclined relative to the plane of said moveable leg defining a first ramp, and a first roller means in said first roller chamber concurrently engaging said first ramp and said moveable wall when said primary clamp is closed so that movement of said moveable wall in said first direction when said primary clamp is closed causes said first roller to roll toward a wedged position between said first ramp and said moveable leg.

3. The motor vehicle steering column recited in claim 2 wherein said first roller means comprises:

a first metal roller, and a rubber ring on said first metal roller operative to enhance traction between said first metal roller and each of said moveable leg and said first ramp.

4. The motor vehicle steering column recited in claim 3 further comprising:

a second roller chamber in said inner jaw element open toward said moveable leg having a bottom inclined relative to the plane of said moveable leg defining a second ramp, and a second roller means in said second roller chamber concurrently engaging said second ramp and said moveable wall when said primary clamp is closed so that movement of said moveable wall in said second direction when said primary clamp is closed causes said second roller to roll toward a wedged position between said second ramp and said moveable leg.

5. The motor vehicle steering column recited in claim 4 wherein said second roller means comprises:

a second metal roller, and a rubber ring on said second metal roller operative to enhance traction between said second metal roller and each of said moveable leg and said second ramp.

* * * * *